United States Patent [19]

Niebling

[11] Patent Number: 4,842,570
[45] Date of Patent: Jun. 27, 1989

[54] DEVICE FOR THE AUTOMATIC SHIFTING OF A TENSIONING ROLLER

[75] Inventor: Peter Niebling, Bad Kissingen, Fed. Rep. of Germany

[73] Assignee: FAG Kugelfischer Georg Schafer (KGaA), Fed. Rep. of Germany

[21] Appl. No.: 209,993

[22] Filed: Jun. 22, 1988

[30] Foreign Application Priority Data

Jul. 22, 1987 [DE] Fed. Rep. of Germany ....... 3724169

[51] Int. Cl.$^4$ .............................................. F16H 7/08
[52] U.S. Cl. ..................................... 474/118; 474/133
[58] Field of Search .............. 474/101, 109, 111, 135, 474/113–117, 133, 134; 56/11.6

[56] References Cited

U.S. PATENT DOCUMENTS

| | | | |
|---|---|---|---|
| 2,679,112 | 5/1954 | Thompson | 474/133 X |
| 2,888,829 | 6/1959 | Roehm | 474/133 |
| 4,530,682 | 7/1985 | Gruber et al. | 474/133 |
| 4,531,348 | 7/1985 | Vilder et al. | 474/101 X |

FOREIGN PATENT DOCUMENTS 0150893  8/1985  European Pat. Off. .
0212119  3/1987  European Pat. Off. .

Primary Examiner—Thuy M. Bui
Attorney, Agent, or Firm—Ostrolenk, Faber, Gerb & Soffen

[57] ABSTRACT

For maintaining a desired level of belt tension upon a change in the spacing of belt rollers on which the belt is trained, which results from heating of the housing that supports at least one of the rollers of the belt, the tensioning roller for the belt is supported on a pivot plate or rocker arm. The plate has a pivot and the tensioning roller is mounted on the plate eccentric of the pivot of the plate. A connecting rod extends between the pivoting plate and a connection point. The connecting rod has a different coefficient of thermal expansion than that of the housing on which the belt roller is supported, whereby as the heat caused expansion of the housing moves the belt rollers apart, the connecting rod pivots the plate for the tensioning roller in a direction and to an extent to maintain a desired, e.g. substantially constant tension level on the belt. Or, the connecting rod and tensioning roller may be positioned for altering the level of tension during heat-caused expansion, e.g., increasing that tension.

9 Claims, 2 Drawing Sheets

DEVICE FOR THE AUTOMATIC SHIFTING OF A TENSIONING ROLLER

BACKGROUND OF THE INVENTION

The present invention refers to a device for shifting a tensioning roller for tensioning a belt.

In one known device for shifting a tensioning roller, a tensioning roller is normally arranged eccentrically on a base plate. That base plate, in its turn, is fastened in pivotable and lockable manner on a housing In such an embodiment, the tensioning roller is shifted by pivoting the base plate on the housing. Its position is fixed by bolting the base plate to the housing. In the event of different heating of individual parts which may result in their different expansions, changes in the tension of the belt then result in operation. Belt tension changes are undesirable, particularly in the case of a drive in which no slippage or skipping of a belt tooth may take place. On the other hand, too high tensioning of the belt should also not occur, as this would lead to its impermissible belt heating and destruction. As shown, for example, in European Published Application No. 150 893, it is therefore customary to have an adjustable bolt and a spring act upon the base plate. Such measures are, however, expensive and complicated. Furthermore, even this does not produce a belt tension which is adapted to the prevailing operating and expansion conditions. If only a spring is used, then impermissible oscillations of the belt result For this reason, hydraulically settable and adjustable devices are proposed in European Published Application No. 212 119. However, they are even more complicated and furthermore require means which produce and regulate the hydraulic pressure.

SUMMARY OF THE INVENTION

It is therefore the object of the present invention to improve a device for the shifting of a tensioning roller so that the above indicated disadvantages do not occur and so that the belt tension is automatically adapted to the prevailing operating conditions by the simplest means.

According to the invention, the belt is trained around a plurality of rollers, and a tensioning roller tightens and tensions the belt. In order to compensate for the change in the spacing of the rollers due to heating of the housing on which the rollers are supported, while maintaining the desired level of belt tension on the rollers, the tensioning roller is supported on a pivotable base plate or rocker arm which is pivoted around a pivot that is eccentric of the tensioning roller.

A connecting means, in the form of a rod having a coefficient of thermal expansion different from that coefficient of the housing, is connected between the rocker arm and a fixed position, such as the housing itself, or elsewhere. The connecting means rod has a different coefficient of thermal expansion than the housing and the rod is so connected with the rocker arm as to pivot the rocker arm in a direction which moves the tensioning roller to maintain the desired level of tension on the tensioned belt. The connection is by means of a rod, because the rod pushes upon the rocker arm to pivot it. The connecting means may alternately be so connected to the rocker arm as to pull the rocker arm, rather than push it, avoiding the need for a stiff rod in that event. The coefficient of thermal expansion of the connecting means rod is related to the coefficient of thermal expansion of the housing on which the rollers are supported that upon a particular level of heating and resulting expansion of the housing, which moves the rollers apart, the rod is also heated to pivot the rocker arm to an extent that the tensioning roller will continue to apply the constant level of tension on the now further spaced apart rollers. Upon cooling of the housing and of the connecting rod, they contract in size. The rollers over which the belt is trained move together and the connecting rod is adapted to move the rocker arm to move the tensioning roller to maintain constant tension on the belt.

In the case of the rocker arm system of the invention, a connecting rod is turnably fastened on the base plate or rocker arm eccentric of and displaced from the point of pivotal attachment of the base plate depending on the direction and size of the correction of the belt tension, and the connecting rod is connected with a given point on the housing. It is furthermore necessary that the connecting rod have a different coefficient of thermal expansion than the adjacent parts. If now the, for instance, aluminum housing is heated, the distance apart of the pulleys changes due to the large coefficient of expansion. The belt itself generally has a different coefficient of expansion than and also is at a different temperature than the housing. As a result, the belt tension changes Upon the selection of a given connecting rod having a given length and a corresponding lever arm and a selected coefficient of thermal expansion, the position of the tensioning roller can then be so changed that the above mentioned operating conditions do not result in any change or at least in a controlled, more limited change in the tension of the belt. In this way, both too low and too high belt tension are avoided.

BRIEF DESCRIPTION OF THE DRAWINGS

Other objects and features of the invention are explained with reference to the accompanying drawings.

DESCRIPTION OF THE PREFERRED EMBODIMENTS

Figure 1:
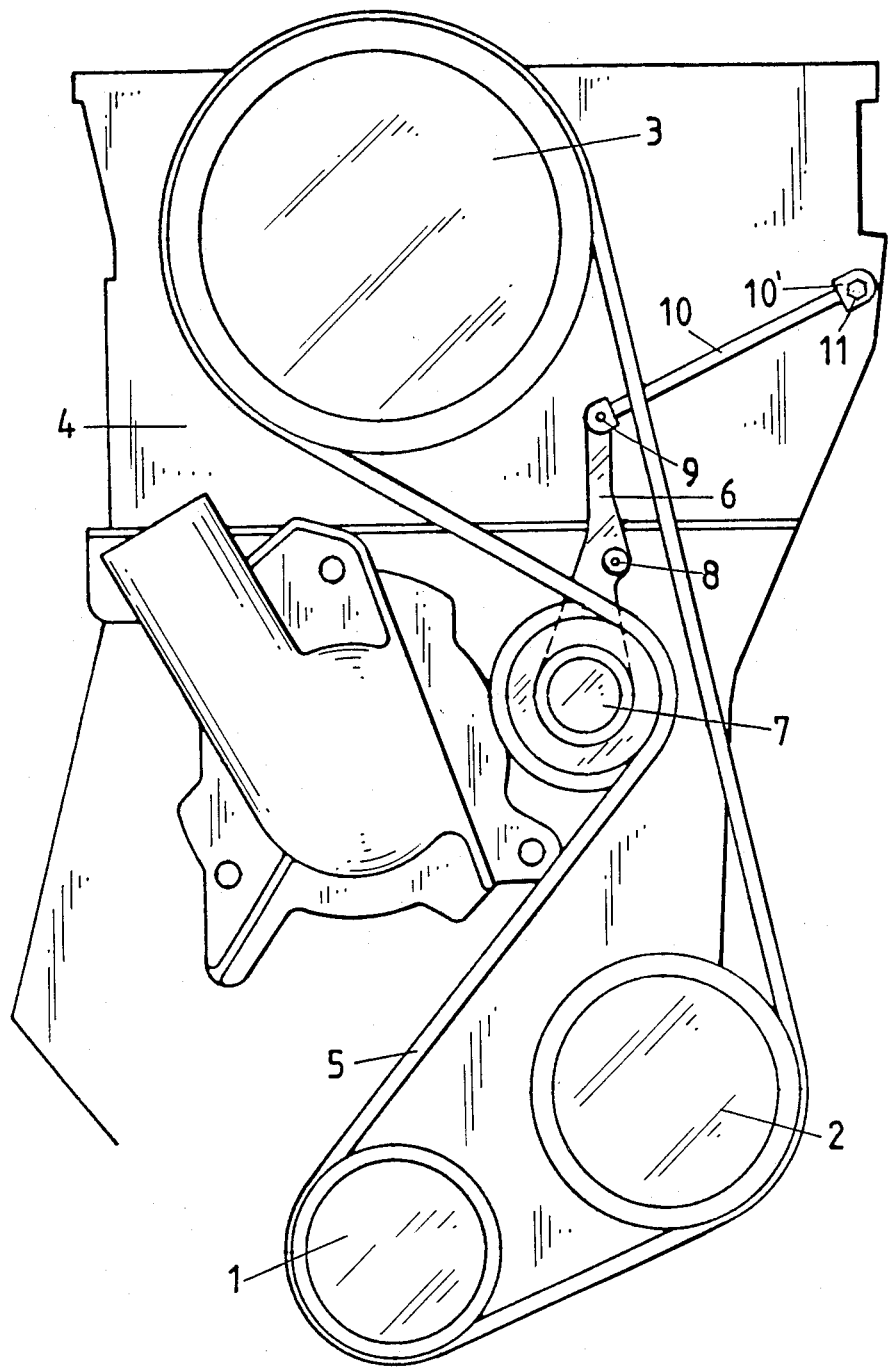
FIG. 1 is a view of, for instance an automobile housing with pulleys, a belt and a tensioning roller.

FIG. 1 shows known belt support pulleys 1, 2 and 3. At least one of the pulleys, 3, is fastened to the, for instance, aluminum housing 4 of, for instance, an internal combustion engine. The pulleys 1, 2 and 3 are connected to each other by a belt 5, that wraps around and is trained on all of them.

For various reasons, the belt 5 should be applied in each case, so far as possible, with a specific tension. The desired level of tension is produced by the tenioning roller 7, which is fastened eccentrically on a base plate or rocker arm 6 and is applied against the exterior side of the belt 5 to deflect the belt and apply tension to it. The base plate 6 is in the form of a rocker arm which is connected to the housing 4 at the point 8 of pivotal attachment. The pivot 8 for the base plate 6 is oriented so that as the plate 6 pivots around the pivot 8, it swings the supported roller 7 with it to adjust belt tension.

For some time, aluminum housings have found increased use in internal combustion engines, and particularly automotive vehicle engines. Upon heating of such a housing 4 during motor operation, the housing expands. This moves the points of attachment of the pulleys 1, 2 and 3 a greater distance apart. This, in turn, causes an undesired increase in the tension of the belt 5.

In order to avoid this, the rocker arm 6, which is connected via the pivot 8 to the housing 4, is connected at a lengthened end via a point 9 of pivotal attachment to a rod 10. The other end 10' of the rod 10 is fastened via another point 11 of pivotal attachment to the housing 4. The rod 10 has a smaller coefficient of expansion than the housing 4, so that the distance between pivots 8 and 11 will increase more than the distance between pivots 9 and 11 upon heating of the housing, belt and rod. This swings the pivot 9 slightly clockwise around the pivot 8. This in turn swings the tensioning roller 7 clockwise since both the pivot 9 and the tensioning roller 7 are arranged on the same rocker lever 6. In this way, the belt 5 is released somewhat and the tension on it is slightly relaxed.

When the temperature of the housing 4 drops, the reverse effect takes place. The distance between the pivots 8 and 11 then decreases more than the distance between the pivots 9 and 11, so that the rocker arm 6 is swung slightly counterclockwise. In this way, the tension on the belt 5 is again increased to maintain the correct tension.

The above correction of the belt tension takes place automatically. Further devices or control systems are not required. It is merely necessary to adapt the specific construction by the selection and calculation of certain data of the connecting rod 10. This may require measurements of temperatures and of the changes in the temperature at the various components, e.g. housing, belt, rocker plate and rod, for a particular engine installation and then selection and placement of an appropriate rod 10.

Figure 2:
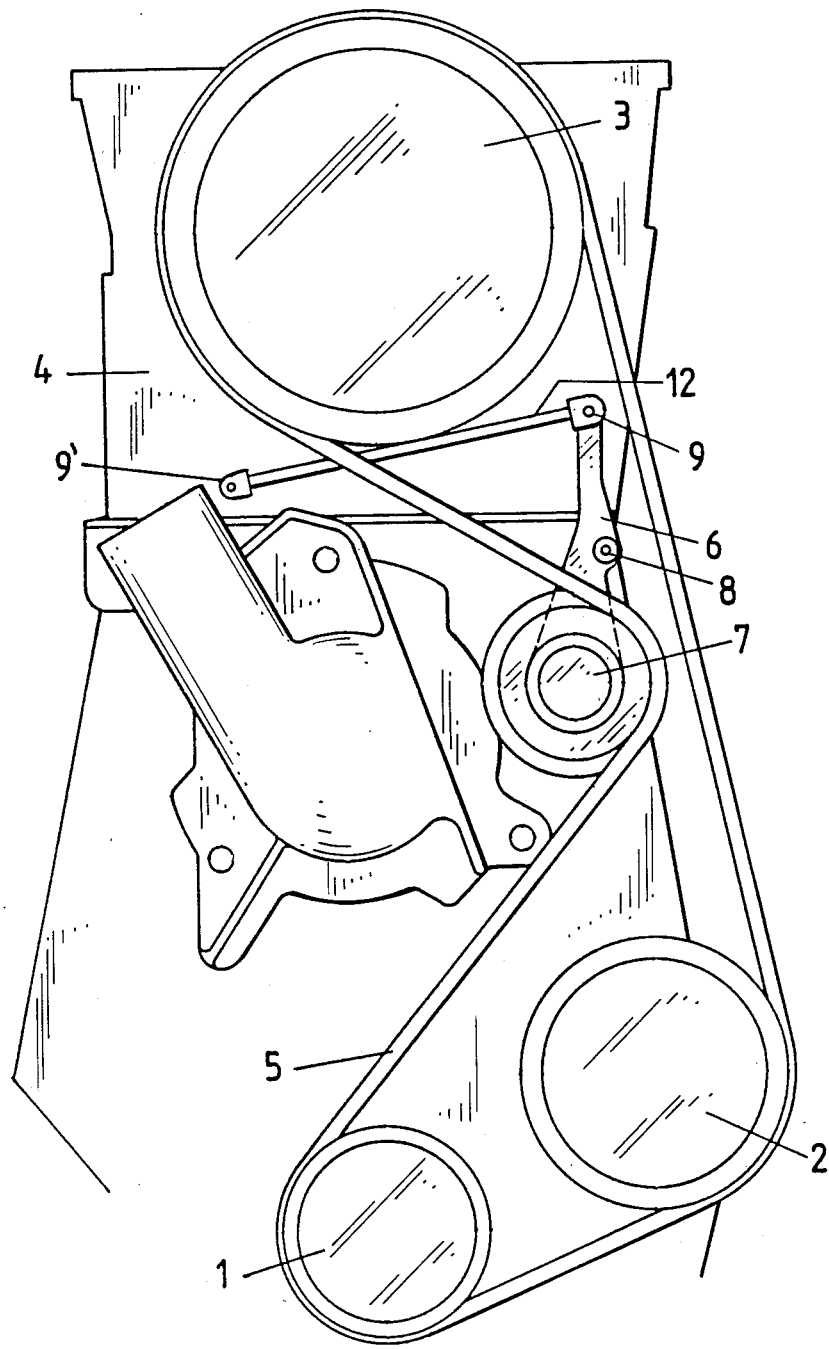
FIG. 2 shows another embodiment similar to FIG. 1.

FIG. 2 shows an embodiment which is similar to FIG. 1. In this case, in place of the rod 10, there is the rod 12 which is arranged on the other side of the rocker arm 6, namely via the point 9' of pivotal attachment. Upon an increase in temperature, the belt tension in this case increases, since the rocker arm 6 is swung in the counterclockwise direction. Such an increase in tension is not normally desired. However, it may be desired in certain machines and can be obtained obviously by a simple change of the point of the attachment to the housing. On the other hand, by selection of a coefficient of thermal expansion of the rod 12 that is greater than that coefficient of the housing, reduced belt tension is obtainable upon elevated housing temperature with the configuration of elements seen in FIG. 2.

Although the present invention has been described in connection with preferred embodiments thereof, many variations and modifications will now become apparent to those skilled in the art. It is preferred, therefore, that the present invention be limited not by the specific disclosure herein, but only by the appended claims.

What is claimed is:

1. A device for automatically shifting a tensioning roller for maintaining a level of tension on a belt, wherein the belt is trained on a plurality of belt rollers and a tensioning roller is applied against the trained belt to deflect the belt and apply tension thereto;
a pivotable base plate; a point of pivot attachment about which the plate pivots; the tensioning roller being mounted to the pivoting plate eccentric of the pivot point of the plate, and the pivot point of the plate being oriented such that pivoting of the plate around the pivot thereof moves the tensioning roller against the belt to alter the tension on the belt;
connecting means connected to the plate eccentrically of the pivot point of the plate and further connected to another point of attachment;
a housing on which at least one of the belt rollers is attached having a different coefficient of thermal expansion than the coefficient of thermal expansion of the connecting means, and the connecting means being oriented so that upon a change in temperature of the housing, the connecting means moves the plate for maintaining a constant level of tension on the belt as the housing is heated and is expanded thereby.

2. The device of claim 1, wherein at least one of the rollers is attached to the housing and the housing is heated to an overall temperature during operation.

3. The device of claim 2, wherein the connecting means comprises a rigid connecting rod pivotally connected to the plate, on the one hand, and pivotally connected to another object, on the other hand.

4. The device of claim 2, wherein the connecting means is connected on the one hand to the plate and on the other hand to the housing.

5. The device of claim 4, wherein the connecting means comprises a rigid connecting rod.

6. The device of claim 4, wherein the connecting means comprises a rigid connecting rod pivotally connected to the plate, on the other hand, and pivotally connected to the housing, on the other hand.

7. The device of claim 2, wherein the belt is an endless belt trained on the belt rollers which are inside the endless belt and the tensioning roller is on the exterior of the endless belt and in engagement with the belt.

8. The device of claim 7, wherein the connecting means has a smaller coefficient of thermal expansion than the coefficient of thermal expansion of the housing and the connecting means is so connected with the plate as to move the tensioning roller outwardly off the tensioning belt to maintain a constant level of tension in the belt as the housing heats and expands.

9. A device for automatically shifting a tensioning roller for maintaining a desired level of tension on a belt, wherein the belt is trained on a plurality of belt rollers and a tensioning roller is applied against the trained belt to deflect the belt and apply tension thereto;
a pivotable base plate, a point of pivot attachment about which the plate pivots; the tensioning roller being mounted to the pivoting plate eccentric of the pivot point of the plate, and the pivot point of the plate being oriented such that pivoting of the plate around the pivot thereof moves the tensioning roller against the belt to alter the tension on the belt;
connecting means connected to the plate eccentrically of the pivot point of the plate and further connected to another point of attachment;
a housing on which at least one of the belt rollers is attached having a different coefficient of thermal expansion than the coefficient of thermal expansion of the connecting means, and the connecting means being oriented so that upon a change in temperature of the housing, the connecting means moves the plate for adjusting the level of tension on the belt as the housing is heated and is expanded thereby;
wherein the connecting means has a different coefficient of thermal expansion than the housing and the coefficient of expansion and the manner of connection of the connecting means to the plate is selected so that the level of tension on the belt is adjustable to maintain a desired level of tension in the heat caused expansion and subsequent cooling caused contraction of the housing and the consequent change in the separation of the belt rollers on which the belt is trained.

* * * * *